(12) United States Patent
Faye et al.

(10) Patent No.: US 9,716,282 B2
(45) Date of Patent: Jul. 25, 2017

(54) FUEL CELL ASSEMBLY

(75) Inventors: Ian Faye, Stuttgart (DE); Thanh-Hung Nguyen-Schaefer, Asperg (DE); Ulrich Gottwick, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1855 days.

(21) Appl. No.: 12/294,284

(22) PCT Filed: Mar. 20, 2007

(86) PCT No.: PCT/EP2007/052606
§ 371 (c)(1),
(2), (4) Date: Jul. 14, 2009

(87) PCT Pub. No.: WO2007/110349
PCT Pub. Date: Oct. 4, 2007

(65) Prior Publication Data
US 2009/0305100 A1    Dec. 10, 2009

(30) Foreign Application Priority Data
Mar. 24, 2006   (DE) ........................ 10 2006 013 669

(51) Int. Cl.
| H01M 8/04 | (2016.01) |
| H01M 8/04746 | (2016.01) |
| H01M 8/04089 | (2016.01) |
| H01M 8/04223 | (2016.01) |
| H01M 8/0438 | (2016.01) |
| H01M 8/0444 | (2016.01) |
| H01M 8/04492 | (2016.01) |
| H01M 8/1018 | (2016.01) |

(52) U.S. Cl.
CPC ..... *H01M 8/04761* (2013.01); *H01M 8/0441* (2013.01); *H01M 8/0447* (2013.01); *H01M 8/04097* (2013.01); *H01M 8/04231* (2013.01); *H01M 8/04522* (2013.01); *H01M 2008/1095* (2013.01)

(58) Field of Classification Search
None
See application file for complete search history.

(56) References Cited

U.S. PATENT DOCUMENTS

| 2004/0110048 | A1 |   | 6/2004 | Hiramatsu et al. | |
| 2004/0214059 | A1 | * | 10/2004 | Enjoji et al. | 429/22 |
| 2005/0214603 | A1 | * | 9/2005 | Barton et al. | 429/22 |
| 2005/0244686 | A1 |   | 11/2005 | Kamihara | |
| 2007/0231636 | A1 | * | 10/2007 | Alp et al. | 429/22 |
| 2010/0008139 | A1 |   | 1/2010 | Bae | |

FOREIGN PATENT DOCUMENTS

WO    2004051780 A2   6/2004

* cited by examiner

*Primary Examiner* — Ladan Mohaddes
(74) *Attorney, Agent, or Firm* — Michael Best & Friedrich LLP

(57) ABSTRACT

The present invention relates to a fuel cell assembly having a fuel cell and an actuating element, which is activated by a control unit, for bringing residual gas out of a fuel flow of the fuel cell. The invention is provided with the control unit having an open-loop and/or closed-loop control system which takes into consideration the fuel concentration in the fuel flow.

21 Claims, 1 Drawing Sheet

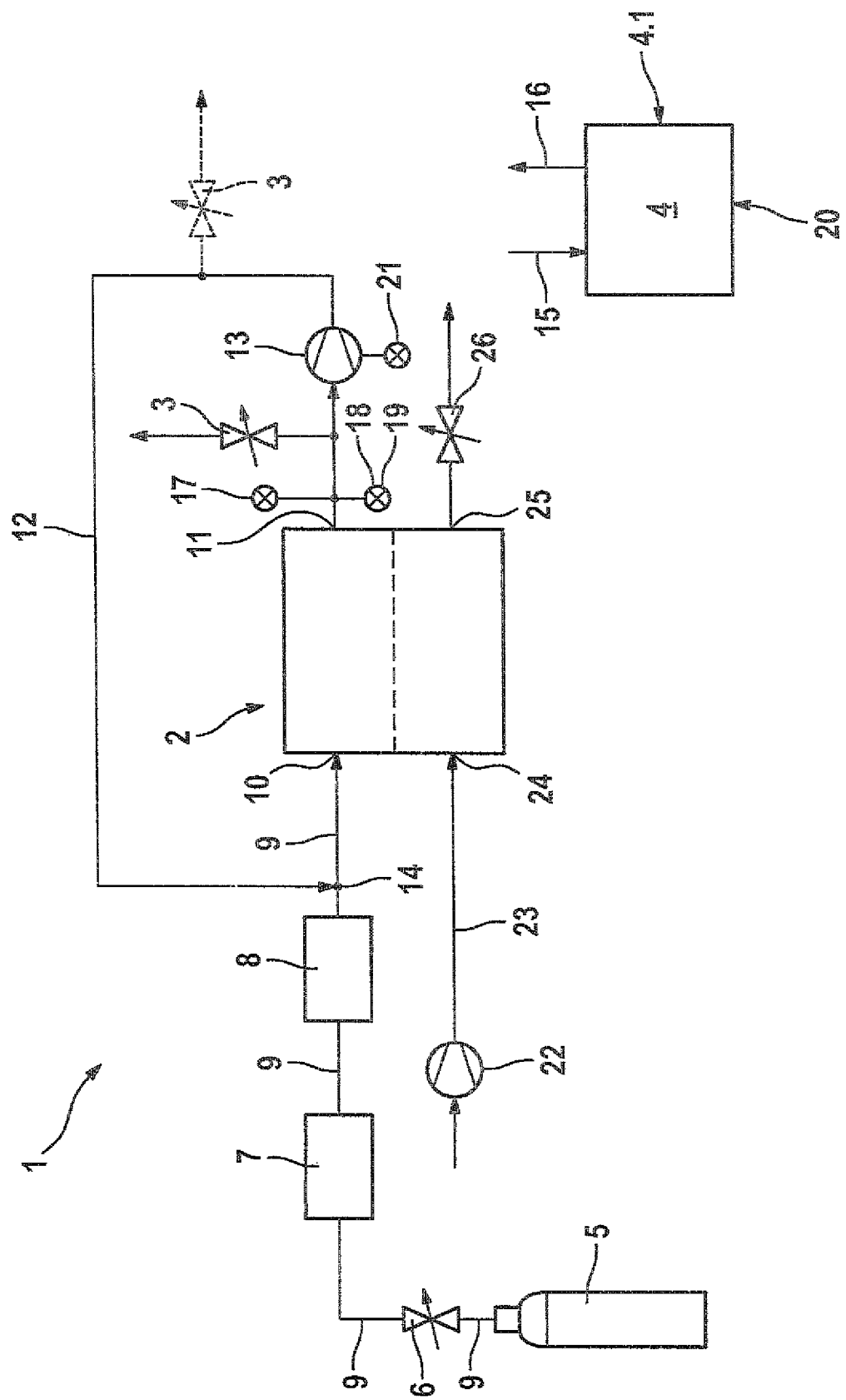

FUEL CELL ASSEMBLY

CROSS-REFERENCE TO RELATED APPLICATION

This application is a 35 USC 371 application of PCT/EP 2007/052606 filed on Mar. 20, 2007.

BACKGROUND OF THE INVENTION

Field of the Invention

The present invention relates to a fuel cell assembly.

Description of the Prior Art

Fuel cells, especially those with a proton-conducting polymer film as a partition between the anode and cathode (proton exchange membrane (PEM) fuel cells), are operated on the anode side with a fuel gas, such as gaseous hydrogen, or gas mixtures containing hydrogen, such as reformate gases.

To improve the efficiency of such fuel cells, it is known to return the residual gas, leaving the anode side of the fuel cell on the outlet side, to the anode inlet side by means of so-called recirculation provisions or paths of the fuel cell. However, since in operation the fuel cell consumes only pure fuel, as a rule hydrogen, such recirculation of the fuel flow causes the concentration of pure fuel in the anode region of the fuel cell to decrease over the course of operation.

This is due to the accumulation of residual gases in this circulation loop, that originate either in the fuel gas supply or from diffusion from the cathode side, or in other words the side of the fuel cell supplied with air, and reach the anode side. This primarily involves nitrogen and water vapor. Because of the contrary or counterflow behavior the residual gas contact rises, and the proportion of pure fuel in the fuel cell drops, and the electrical voltage of the fuel cell drops as well. Increasingly, with high fuel gas consumption, the dynamics of the gas transportation to the proton exchange membrane (PEM) are slowed down.

To avoid high accumulations of residual gases in the anode region of the fuel cell, it is therefore known to cause the gas emerging from the anode region of the fuel cell to be vented to the environment, either permanently via a throttle restriction, or in a different embodiment, at regular time intervals via a suitably triggered valve. Such valves are known for instance by the term "purge valve".

OBJECT AND SUMMARY OF THE INVENTION

It is therefore the object of the present invention to improve a fuel cell assembly of the generic type defined at the outset.

Accordingly, a fuel cell assembly, having a fuel cell and an actuating element, controlled by a control unit, for venting residual gas from a fuel flow of the fuel cell. It is distinguished according to the invention in that the control unit includes an open-loop and/or closed-loop control system that takes the fuel concentration in the fuel flow into account.

This mode of operation is based on the recognition that in the methods usual until now for venting residual gases, either permanently via a throttle restriction or by opening a valve at regular time intervals, not only is the unwanted portion of residual gases in the fuel flow or fuel flow of the fuel cell vented on the anode side, but necessarily as yet unconverted fuel from the anode as well. The lower the concentration of the residual gas and hence the higher the concentration of the fuel, which is preferably hydrogen, the higher are the losses from venting this unused fuel. This finding applies to both previously known methods for venting residual gases.

Based on this, the present invention proposes venting residual gas from the fuel flow by means of the actuating element only whenever the concentration of the fuel falls below a defined, predeterminable value, or if defined, unwanted concentrations of other substances in the residual gas exceed an impermissible value. As a result, fuel losses from unnecessary venting or exhausting of residual gas from the fuel flow are avoided, in a way that increases the efficiency of the fuel cell.

For ascertaining the partial pressure or the concentration of the fuel in the fuel flow, for instance in a first mode of operation, a fuel concentration sensor can be provided, which forwards a signal accordingly to the control unit that actuates the actuating element. Especially preferably, a fuel sensor can be used for this purpose that has high sensitivity especially to high fuel concentrations, or in other words that furnishes a good, high-resolution, precise signal in such an application. For fuel cells operated with hydrogen, it would be a suitably sensitive hydrogen sensor.

Besides the principle of monitoring the fuel concentration in the fuel flow for triggering the actuating element in order to vent the residual gas, a second mode of operation is furthermore proposed, which can be put to use separately or along with the first principle. In it, the concentration of nitrogen in the fuel flow is monitored by a nitrogen concentration sensor that is in communication with the control unit. If a certain nitrogen concentration value is exceeded, the control unit, in accordance with the above description, causes residual gases to be vented from the fuel flow.

In a third mode of operation, again alone or in combination with one or both of the modes of operation described, the concentration of water vapor in the fuel flow can be monitored, and if a certain maximum value is exceeded, the actuating element can be made by the control unit to vent the residual gas.

Besides these direct ways of monitoring concentration values, the present invention also discloses an indirect possibility for monitoring, in which a detection mechanism for the fuel quantity supplied is provided. To that end, a relevant magnitude of the power consumption of a fuel recirculation device can for instance be used. Particularly suitable devices for this purpose are current, voltage, and/or power detection mechanisms, such as corresponding converters whose signals are picked up and are evaluated so that suitable provisions can be initiated.

The recirculation device can for instance be a recirculation compressor, a recirculation pump, or others of this kind. Since these devices in some way or other have rotationally or translationally actuated components, a further possibility for detecting the fuel concentration in the fuel flow is to evaluate the signal of a suitably disposed sensor, such as an rpm or stroke frequency meter. Volumetric flow detection is also conceivable, for instance by a flow rate meter, for instance in the form of an impeller wheel counter.

Especially by a comparison with known power consumptions or also rotary speeds, frequencies, or volumetric flows, which can be associated with certain fuel concentrations, an unambiguous statement can be made about the concentration of pure fuel in the fuel flow, and thus in turn, exact influence on the venting of residual gas from the fuel flow is possible by actuating the actuating element via the control unit.

For actuating the actuating element, in a simple embodiment of the control unit, a time-based triggering can for instance be provided. Thus after a certain concentration limit value is exceeded or undershot, for instance, a so-called "purge operation" can be brought about, that is, the venting of residual gas by opening the actuating element. After a defined, predeterminable length of time has elapsed, this operation is ended again, and then repeated if necessary until the resultant proportion of extraneous gas has decreased again to an allowable value, or has a sufficiently high concentration of pure fuel.

Besides this kind of comparatively simply constructed open-loop control system, in a higher-quality embodiment, closed-loop control, or regulation, can also be provided for valve actuation. The control unit can for instance regulate the flow rate of residual gas by means of the actuating element, by varying the opening time of the actuating element. In a further improved embodiment, a variation in the effective cross section of the actuating element can be provided, in order to influence the flow rate of residual gas, by means of the actuating element. As the actuating element, a switching valve could be provided for instance in the first case, and in the second case, a suitably triggered proportional valve or a regulating valve could be provided. Thus many forms of regulation can be implemented, such as regulation in which the set-point magnitude is effected by simply opening the final control element, or regulation in which pilot control is effected as a function of the pressure in the anode path, and the precise metering is effected by a superimposed regulation, and so forth.

BRIEF DESCRIPTION OF THE DRAWING

The invention will be described in further detail in conjunction with the drawings, in which:

The sole drawing FIGURE is a schematic illustration of a fuel cell assembly according to the invention in the form of a block circuit diagram.

DESCRIPTION OF THE PREFERRED EMBODIMENT

The fuel cell assembly 1 in the appended drawing accordingly includes a fuel cell 2 and an actuating element 3, e.g., a purge valve, for venting residual gas from an anode-side fuel flow, which element, to that end, is actuated as a function of certain operating parameters by a control unit 4 that is equipped with an open-loop and/or closed-loop control system 4.1. The operating parameters may preferably be the concentration values for pure fuel, or the further residual gas components, such as nitrogen or water vapor.

For supplying the fuel cell 2 with fuel, a fuel reservoir 5, for instance, is connected via a valve 6 and, downstream in the supply direction, a pressure regulator 7 and a fuel metering unit 8 to a fuel supply line 9. Through the inlet 10, the thus-delivered fuel gas, preferably hydrogen or a gas mixture containing hydrogen, such as reformate gas, enters the anode side of the fuel cell 2 in the form of a volumetric flow that is at an appropriate pressure.

In operation of the fuel cell, only some of the hydrogen is used for generating electrical energy. The unused amount of delivered gas leaves again through the anode-side outlet 11 of the fuel cell 2. To avoid high hydrogen losses, this residual gas is fed back into the supply line 9 by means of a recirculation device 13, via a recirculation path 12, at a feedback point 14.

For coupling the control unit 4 to the various units of the fuel cell assembly, as well as for supplying energy and optionally outputting further signals to other open- and/or closed-loop control units, the input vector 15 and the output vector 16 are shown symbolically in the drawing. In particular, these two vectors include forwarding signals from detection units 17, 18, 19 to the control unit 4, and from the control unit 4 to the actuating element 3.

A first detection unit is represented for instance by the fuel concentration sensor 17, which is connected to the recirculation path 12 at the outlet 11. Preferably, in this exemplary embodiment, it is a hydrogen sensor with high sensitivity in the range of high hydrogen concentrations, so that as high-resolution and precise a signal as possible for the operating situation then occurs predominantly can be made available to the control unit 4.

If a predeterminable minimum concentration value of pure fuel in the residual gas is undershot, the control unit 4 forwards a signal, via the output vector 16, for actuating the actuating element 3 in order to vent a certain quantity of residual gas from the fuel flow, via this so-called "purge device". As a result, a comparatively highly concentrated fuel then flows into the anode region of the fuel cell, since now, the fuel cell is supplied essentially only via the fuel metering unit supplied from the fuel reservoir 5. With this increased partial pressure of the fuel, the electrical voltage induced by the fuel cell increases in turn at the electrical terminal elements, not shown, of the fuel cell 2. The dynamics of the fuel cell are markedly improved as well, particularly at high fuel gas consumption.

A second possible way of signaling a decreasing fuel concentration in the fuel flow is attained by the disposition of a nitrogen concentration sensor 18, which is likewise connected to the control unit 4 via the input vector 15. If a certain nitrogen concentration is exceeded, which can occur for instance from diffusion from the cathode side of the fuel cell 2 to the anode side, then the purge valve 3 as described above can be actuated again by the control unit 4.

A further possible way of actuating this purge valve 3 because of impermissible conditions in the fuel flow can be brought about by signalling an overly high water vapor concentration by means of a suitable concentration sensor 19. For the sake of simplicity, this water vapor concentration sensor 19 is simultaneously shown as a nitrogen concentration sensor 18. However, for implementation, selectively only one of these sensors, or two of them in separate versions, will be provided. However, a combined embodiment of this kind with both sensors, or with the fuel concentration sensor 17, is also conceivable. However, all three can be combined as well.

A further possible way of actuating the purge valve 3 is proposed by the detection of a relevant variable of the power consumption of the fuel recirculation device 13. In a preferred embodiment, a detection means of this kind is an electrical or electronic component that detects current, voltage or power and that is preferably accommodated in the control unit 4, so that no additional signal lines are necessary. However, it is understood that a separate embodiment of these components is also possible.

Still another possibility for triggering or regulating the purge valve, depending on the embodiment of the valve and of the control unit 4, is possible by detecting the rpm of a rotating element of the recirculation device 13, for instance by means of an rpm meter 21. The signal made available to the control unit 4 by a suitable conversion of the rpm can for instance act as an input vector of a computation algorithm, which when linked with a reserved set of parameters serves to actuate the purge valve 3.

Particularly by the reservation of fuel concentrations associated with various rotary speeds of the rpm meter and/or concentrations of unwanted other gas ingredients in the residual gas, an exact determination of the composition of the residual gas is possible. The triggering and regulation of the purge valve 3 by the control unit 4 can become variously complex. In a simple embodiment, if a critical value of a residual gas proportion is undershot or exceeded for a defined length of time, a purge valve embodied as a simple switching valve can be triggered and then closed again by retraction of this signal. For more-sophisticated or finer metering, a regulating system can be provided in which the control unit 4 switches a suitably embodied valve 3 either in various steps, or optionally regulates it in graduated or continuously variable fashion. By means of such an embodiment, the duration of the purging operation can be adapted optimally to the applicable operating state of the fuel cell.

The foregoing relates to the preferred exemplary embodiment of the invention, it being understood that other variants and embodiments thereof are possible within the spirit and scope of the invention, the latter being defined by the appended claims.

The invention claimed is:

1. A fuel cell assembly, comprising:
   a fuel cell;
   a pump configured to move fuel through the fuel cell;
   a valve configured to vent residual gas from a fuel flow of the fuel cell;
   a detection mechanism configured to detect power consumption of the pump, rpm of the pump, or stroke of the pump; and
   a control unit configured to receive a signal from the detection mechanism representing an actual power consumption of the pump, rpm of the pump, or stroke of the pump, determine an actual fuel concentration in the fuel flow based on the signal, and control the valve based on the actual fuel concentration in the fuel flow.

2. The fuel cell assembly as defined by claim 1, further comprising a fuel concentration sensor.

3. The fuel cell assembly as defined by claim 2, wherein a preferred operating range of the fuel concentration sensor matches a predominantly prevailing fuel concentration range of the fuel cell.

4. The fuel cell assembly as defined by claim 1, further comprising a hydrogen concentration sensor.

5. The fuel cell assembly as defined by claim 2, further comprising a hydrogen concentration sensor.

6. The fuel cell assembly as defined by claim 3, further comprising a hydrogen concentration sensor.

7. The fuel cell assembly as defined by claim 1, further comprising a nitrogen concentration sensor.

8. The fuel cell assembly as defined by claim 2, further comprising a nitrogen concentration sensor.

9. The fuel cell assembly as defined by claim 4, further comprising a nitrogen concentration sensor.

10. The fuel cell assembly as defined by claim 2, further comprising a water vapor concentration sensor.

11. The fuel cell assembly as defined by claim 4, further comprising a water vapor concentration sensor.

12. The fuel cell assembly as defined by claim 7, further comprising a water vapor concentration sensor.

13. The fuel cell assembly as defined by claim 2, further comprising a detection mechanism configured to measure a supplied fuel quantity.

14. The fuel cell assembly as defined by claim 4, further comprising a detection mechanism configured to measure a supplied fuel quantity.

15. The fuel cell assembly as defined by claim 10, further comprising a detection mechanism configured to measure a supplied fuel quantity.

16. The fuel cell assembly as defined by claim 1, wherein the control unit is further configured to trigger the valve in accordance with a set-point value of a measured fuel concentration.

17. The fuel cell assembly as defined by claim 1, wherein the valve is a switching valve and the control unit is further configured to regulate a flow rate of residual gas by varying the opening time of the switching valve.

18. The fuel cell assembly as defined by claim 1, wherein the valve is a proportional valve and the control unit is further configured to regulate a flow rate of residual gas by varying an effective cross section of the proportional valve.

19. The fuel cell assembly as defined by claim 1, wherein the control unit is further configured to trigger the valve in a graduated or continuously variable fashion so that a duration of the venting operation is optimized to an operating state of the fuel cell.

20. The fuel cell assembly as defined by claim 10, wherein the control unit is further configured to receive a signal from the water vapor concentration sensor and forward the signal to the valve to vent a quantity of residual gas from the fuel flow of the fuel cell.

21. A method of operating a fuel cell assembly, the method comprising:
    moving, with a pump, fuel through a fuel cell;
    venting, with a valve, residual gas from a fuel flow of the fuel cell;
    detecting, with a detection mechanism, power consumption of the pump, rpm of the pump, or stroke of the pump;
    receiving, with a control unit, a signal from the detection mechanism;
    determining, with the control unit, an actual fuel concentration in the fuel flow based on the signal; and
    controlling, with the control unit, the valve based on the actual fuel concentration in the fuel flow.

* * * * *